Sept. 2, 1958 H. J. WOLL 2,850,680
REGULATED POWER SUPPLY
Filed March 25, 1954 2 Sheets-Sheet 1

INVENTOR.
Harry J. Woll
BY
ATTORNEY

Sept. 2, 1958      H. J. WOLL      2,850,680
REGULATED POWER SUPPLY
Filed March 25, 1954      2 Sheets-Sheet 2
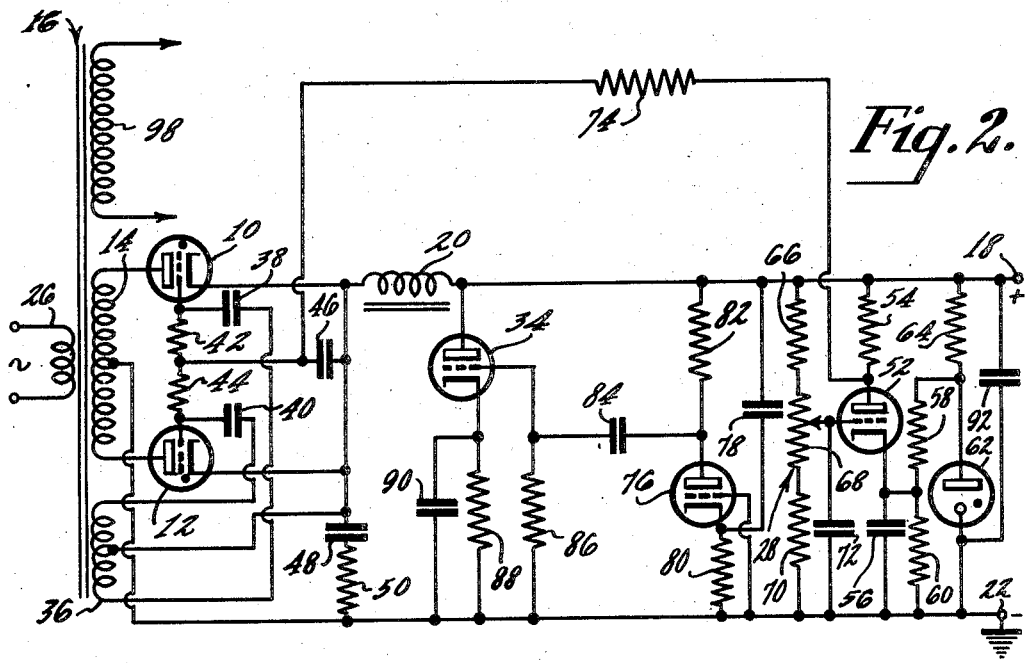
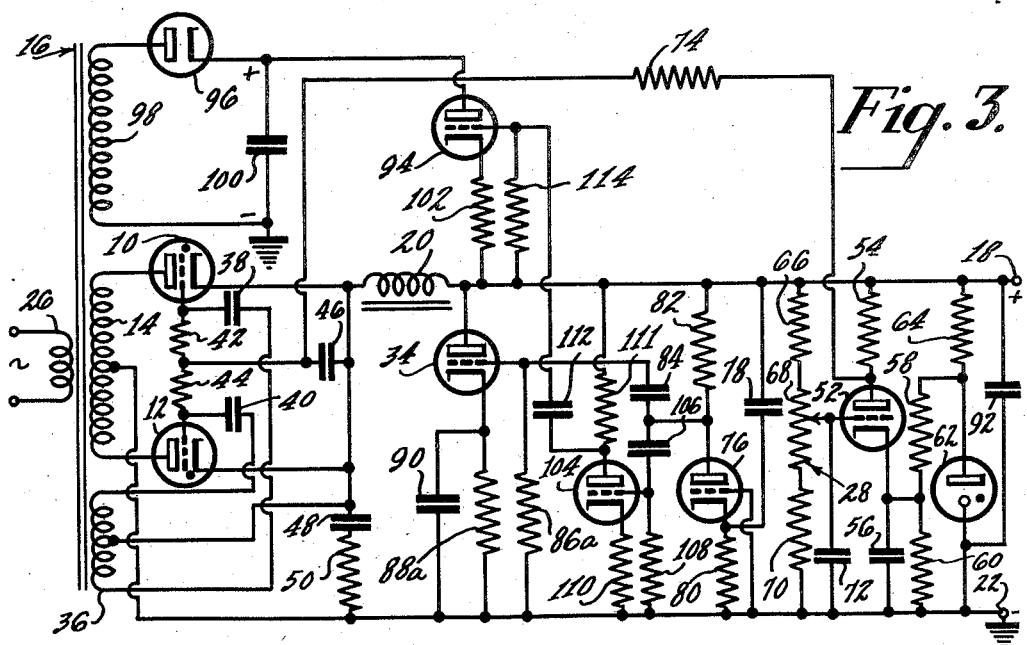
INVENTOR.
*Harry J. Woll*
BY *Morrish Rabbin*
ATTORNEY United States Patent Office 2,850,680
Patented Sept. 2, 1958

2,850,680

REGULATED POWER SUPPLY

Harry J. Woll, Haddon Heights, N. J., assignor to Radio Corporation of America, a corporation of Delaware Application March 25, 1954, Serial No. 418,599

10 Claims. (Cl. 315—205)

This invention relates generally to regulated power supplies, and more particularly to the regulation of power supplies, employing gas tubes as rectifiers. While neither specifically nor exclusively limited thereto, the regulated power supply of the present invention is particularly useful for supplying energy at a relatively high current rate with a minimum of heat dissipation.

It has been proposed to regulate most conventional power supplies by controlling the resistance of a variable resistance series regulator tube, connected between the source of unregulated voltage and one of the output terminals of the power supply. While this method of regulation is generally satisfactory for conventional power supplies, the voltage drop across the variable resistance series regulator tube represents wasted energy, thereby affecting the efficiency of the power supply. Another limitation of this conventional power supply is the amount of current that may be drawn from it is limited by the current carrying capacity of the variable resistance series regulator tube.

Where power supplies capable of producing a power output at a relatively high current rate are desired, gas tubes, such as thyratrons, are used as rectifiers. While it is possible to regulate the voltage output of a thyratron rectifier by means of a variable resistance series regulator tube, connected between the source of unregulated voltage and the positive output terminal of the power supply, the amount of current that may be drawn from the power supply is limited by the current carrying capacity of the variable resistance series tube. Also, the problem of dissipating the relatively large quantities of heat in these power supplies presents a very serious problem.

It is, therefore, a principal object of the present invention to provide an improved regulated power supply, employing gas tubes as rectifiers, that is capable of providing a power output at a relatively high current rate, and that will overcome the aforementioned disadvantages of conventional power supplies.

It is another object of the present invention to provide an improved power supply of the type described, having separate means for compensating for fluctuations in the output voltage at frequencies below and above the rectification frequency, respectively.

A further object of the present invention is to provide an improved regulated thyratron power supply that has a relatively lower heat dissipation than conventional power supplies of comparable power outputs.

Still a further object of the present invention is to provide an improved regulated thyratron power supply that is simple in construction, easy to operate, and yet highly efficient in use.

According to the invention, these and other objects and advantages are attained in a regulated power supply employing a pair of grid-controlled gas tubes connected as full wave rectifiers. Relatively slow fluctuations or changes in the output voltages of the power supply, that is fluctuations at the frequency of rectification or lower, are achieved by controlling the average conduction of the thyratrons by means of degeneratively fedback samples of the output voltage, referred to a standard voltage. Ripple voltage fluctuations and fast transient voltage changes, occurring at a frequency greater than that of the rectification frequency, are compensated for by means of a variable impedance device connected across the output terminals. The impedance of this device is controlled inversely in proportion to fedback samples of the output voltage. In one embodiment of the invention, a separate variable impedance is provided for increases and decreases, respectively, in the output voltage, and each of the variable impedances is operated with near cut-off bias, whereby the overall efficiency of the power supply is increased.

The novel features of the invention, as well as the invention itself, both as to its organization and method of operation, will be understood in detail from the following description when considered in connection with the accompanying drawings in which similar reference numerals refer to similar elements, and in which:

Fig. 2 is a schematic diagram of one embodiment of the regulated power supply of the present invention; and Fig. 3 is a schematic diagram of another embodiment of the regulated power supply of the present invention.

Figure 1:
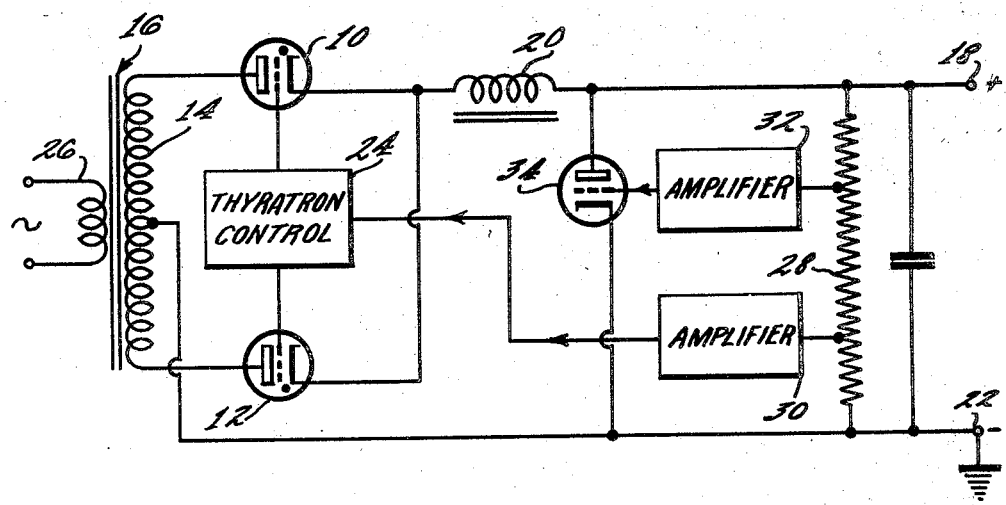
Fig. 1 is a schematic diagram, partly in block form, of a regulated power supply in accordance with the present invention.

Referring now to Fig. 1, there is shown a schematic diagram of a power supply illustrating the principles of the present invention. The power supply of Fig. 1 comprises a pair of grid-controlled gas tubes 10 and 12, such as thyratrons, connected to function as a full-wave rectifier. The anodes of the tubes 10 and 12 are connected to each other through a center tapped secondary winding 14 of a transformer 16. The cathodes of the tubes 10 and 12 are connected to each other, and to a positive output terminal 18 through a filter choke 20. The center tap of the secondary winding 14 is connected to a negative output terminal 22, which, in turn, may be connected to ground.

The thyratron control means 24, represented in Fig. 1 in block diagram form, are provided to control the firing of the tubes 10 and 12 in a predetermined phase relationship to an alternating voltage (not shown), applied to a primary winding 26 of the transformer 16. Thus, it will be understood that an alternating voltage applied across the ends of the primary 26 of the transformer 16 will appear as a rectified D. C. voltage output across the positive and negative output terminals 18 and 22.

Means are provided to regulate the D. C. voltage output across the output terminals 18 and 22 by feeding back a sample of the voltage output degeneratively, compared with a standard voltage, to the grids of the tubes 10 and 12, through the thyratron control means 24. To this end, a sample of the D. C. voltage output is derived from a tap on a bleeder resistor 28 connected between the positive and negative output terminals 18 and 22. The sample voltage is applied to the input of an amplifier 30, and the output voltage of the amplifier 30, which is of opposite polarity to the input sample voltage, is applied to the thyratron control means 24 to control the average conduction of the tubes 10 and 12, in a manner to be explained hereinafter.

Since the feedback system comprising the amplifier 30 and the thyratron control means 24 can respond to fluctuations in output voltage of frequencies substantially no greater than the frequency of rectification by the tubes 10 and 12, additional regulatory means must be provided to furnish regulation caused by transient voltages occurring at frequencies greater than that of the frequency of rectification. To this end, the input of an amplifier 32 is also connected to a tap on the bleeder resistor 28 to sample the output voltage. The output of the amplifier 32 is connected to the grid of a variable impedance device, such as a triode tube 34, in a manner to vary the impedance of the triode tube 34 inversely in proportion to the magnitude of the fedback sample voltage. The variable impedance triode 34 has its anode connected to the positive output terminal 18 and its cathode connected to the negative output terminal 22. It is obvious that a single amplifier can be substituted for the amplifiers 30 and 32 where economy and weight are objectives.

Referring now to Fig. 2, there is shown a schematic diagram of a regulated thyratron power supply, in accordance with the principles of the invention illustrated in, and described for Fig. 1. The thyratron control means 24 of Fig. 1 is shown in Fig. 2 as comprising a center tapped tertiary winding 36 of the transformer 16. Each of the ends of the tertiary winding 36 is connected to a separate one of the grids of the tubes 10 and 12, respectively, through capacitors 38 and 40, respectively. The grids of the tubes 10 and 12 are connected to each other through resistors 42 and 44, connected in series with each other. The common junction of the resistors 42 and 44 is connected to the cathodes of the tubes 10 and 12 through a capacitor 46. It will now be understood that the circuit including the tertiary winding 36, the capacitors 38 and 40 and the resistors 42 and 44 comprise a leading phase shift network whereby an A. C. bias is furnished to the grids of the tubes 10 and 12, shifted in phase with respect to the anode voltage on the tubes 10 and 12. The center tap of the tertiary winding 36 is connected to the cathodes of the tubes 10 and 12, and to ground through a series circuit comprising a capacitor 48 and a resistor 50.

The amplifier 30 and voltage divider of Fig. 1 are represented in Fig. 2 as an amplifier triode tube 52 and its associated circuitry. The anode of the tube 52 is connected to the positive output terminal 18 through a load resistor 54. The cathode of the tube 52 is connected to ground through a capacitor 56. The cathode of the tube 52 is also connected to the common junction of resistors 58 and 60, connected in series with each other and across a voltage regulator tube 62. The anode of the voltage regulator tube 62 is connected to the positive terminal 18 through a current limiting resistor 64, and the cathode of the voltage regulator tube 62 is connected directly to ground. Since the voltage drop across the voltage regulator tube 62 is substantially constant over a relatively wide range of output voltages of the power supply, it will be seen that the cathode of the amplifier triode tube 52 is maintained at a substantially constant voltage.

The voltage divider, or bleeder resistor 28, of Fig. 1 is represented in Fig. 2 as comprising a resistor 66, a potentiometer 68 and a resistor 70 connected to each other in series. The variable tap of the potentiometer 68 is connected to the grid of the amplifier tube 52, and to ground through a capacitor 72.

Means are provided to feed back degeneratively a sample of the D. C. voltage output to the grids of the tubes 10 and 12 to control the average conduction through these tubes for regulatory purposes. To this end, the anode of the amplifier triode tube 52 is connected to the common junction between the resistors 42 and 44 through a resistor 74.

Since any corrective action, or regulation, resulting from the fedback signal from the anode of the amplifier triode tube 52 to the grids of the tubes 10 and 12 cannot occur any faster than the frequency of rectification determined by the alternating voltage input applied to the primary winding 26 of the transformer 16, means must be provided to compensate for changes in the D. C. voltage occurring at frequencies higher than the frequency of rectification. To this end, an amplifier tube, such as a triode tube 76, is provided to sample transients at frequencies relatively higher than the frequency of rectification. A capacitor 78 having one side connected to the positive output terminal 18, and the other side connected to ground, through a resistor 80, forms a voltage divider across the output positive and negative terminals 18 and 22. The cathode of the amplifier triode 76 is connected to the junction between the capacitor 78 and the resistor 80 in order to sample changes in the output voltage occurring at frequencies greater than the frequency of rectification. The grid of the amplifier triode 76 is grounded, and the anode of the amplifier triode 76 is connected to the positive output terminal 18 through a load resistor 82. The anode of the amplifier 76 is connected to the grid of the amplifier triode 34 through a coupling capacitor 84. The grid of the tube 34 is also connected to ground through a resistor 86. The cathode of the tube 34 is connected to ground through a resistor 88, connected in parallel with a bypass capacitor 90.

The amplifier 32 of Fig. 1 may be considered to comprise the amplifier triode tube 76 and its related circuitry. Fluctuations or voltage changes in the D. C. voltage output that may occur at a frequency higher than that of the changes compensated for by the circuitry comprising the amplifier 76 and a shunt regulator tube 34 may be filtered out by a relatively small filter capacitor 92, connected between the positive output terminal 18 and the negative output terminal 22.

The operation of the regulated grid-controlled thyratron power supply of Fig. 2, in accordance with the present invention, will now be described. An alternating voltage applied across the ends of the primary winding 26 of the transformer 16 will appear as a D. C. voltage output across the output terminals 18 and 22 of the power supply, in the following manner. The transformed voltage appearing periodically and alternately on the anodes of the tubes 10 and 12 are sufficient to breakdown the gas within the thyratrons 10 and 12 and to cause them to conduct alternately. The grids of the thyratrons 10 and 12 have applied to them voltages whereby the average conduction through the thyratrons 10 and 12 are controlled. Thus, it will be understood that by controlling the voltage, or bias, on the grids of the tubes 10 and 12, conduction through these tubes may be advanced or retarded within each cycle of rectification in accordance with the charges that are superimposed on these grids.

Let it now be assumed that because of a relatively slow increase in the input alternating voltage to the primary winding 26, and/or a relatively slow decrease in the load (not shown), across the output terminals 18 and 22, there is a tendency for the D. C. voltage output, across the terminals 18 and 22, to increase. A sample of the increased voltage is derived by the grid of the amplifier tube 52, causing the amplifier tube 52 to conduct more heavily. As a result of increased conduction through the tube 52, a negative-going voltage at the anode thereof is applied to the grids of the tubes 10 and 12 through the resistor 74 and the resistors 42 and 44. Thus, the average conduction of the tubes 10 and 12 will be reduced and consequently less current will flow to the load. Less current through the load, means a smaller voltage drop across the output terminals 18 and 22, thereby overcoming the tendency of the voltage across the output terminals 18 and 22 to rise. A tendency for the D. C. voltage output to decrease results in a reverse set of conditions whereby more current is provided for the load. Thus, the tendency for the D. C. voltage output to decrease is offset.

Let it now be assumed that for some reason, such as a change in the load, at a frequency relatively higher than the frequency of rectification, there is a tendency for the output voltage to change accordingly. For instance, let it be assumed that there is a sudden tendency for the voltage across the output terminals 18 and 22 to increase. This positive-going voltage is sampled by the cathode of the amplifier tube 76, and the cathode tends to go positive. A tendency for the cathode of the amplifier tube 76 to go positive is, in effect, the same as the grid tending to go negative, and conduction through the amplifier tube 76 will decrease. As a result of a decreased conduction through the amplifier tube 76, a positive-going voltage is derived at the anode thereof, and coupled to the grid of the shunt regulator tube 34. A positive-going signal on the grid of the shunt regulator tube 34 causes more current to be conducted therethrough, thereby providing less current for the load (not shown). Thus, it is seen that a tendency for a transient voltage, occurring at a relatively high frequency to change the output voltage of the power supply is compensated for by means of the A. C. coupled shunt regulator tube 34. In a similar manner any tendency, occurring at a frequency higher than that of rectification, for the output voltage to decrease, is offset by a reverse set of conditions whereby the impedance of the shunt regulator tube 34 is caused to decrease and thereby provide more current for the load, and to increase the voltage thereacross. Thus, it is seen that the shunt regulator tube 34 is a variable impedance device whose impedance varies inversely with the magnitude of the fedback sample of the D. C. voltage output.

In order for the regulator thyratron power supply of Fig. 2 to compensate for tendencies in the D. C. voltage output to increase or decrease, it is necessary for the shunt regulator tube 34 to operate as substantially a class A amplifier. This means that the shunt regulator tube 34 would normally conduct at substantially one-half of its rated current capacity. Where it is desired to cut down on the heat dissipation of the power supply, and also to increase its efficiency, the shunt regulator tube 34 may be biased to almost cut-off so that it will compensate only for positive increases in voltage. An additional means must be provided, however, to compensate for decreases in the output voltage.

Referring now to Fig. 3 there is shown another embodiment of a grid-control thyratron power supply wherein an additional shunt regulator tube 94 is provided to compensate for negative-going changes in the output voltage across the output terminals 18 and 22, occurring at frequencies higher than the frequency of rectification. The shunt regulator tube 34, in Fig. 3, is now biased to almost cut-off by means of resistors 86a and 88a. Thus, it will be understood that a tendency for the output voltage across the terminals 18 and 22 to go positive will be sensed by the cathode of the amplifier tube 76 and a positive-going signal from the anode thereof will be applied to the grid of the shunt regulator tube 34, thereby causing it to conduct more heavily. It will be noted, however, that with the shunt regulator tube 34 biased to almost cut-off, that it will not respond to sudden tendencies of the output voltage, across the output terminals 18 and 22, to decrease. Under the latter conditions, the shunt regulator 34 will be cut-off, and its regulatory function will cease. Under these conditions, the shunt regulator tube 94 will become operative in a manner to be described.

The shunt regulator tube 94 is provided with an operating voltage from a rectifier 96. The anode of the rectifier tube 96 is connected to one end of a quaternary winding 98 of the transformer 16. The other end of the quaternary winding 98 is connected to ground. A storage capacitor 100 is connected between the cathode of the rectifier tube 96 and ground. The cathode of the shunt regulator tube 94 is connected to the positive output terminal 18 through a resistor 102.

The input to the grid of the shunt regulator 94 is derived from the output of the amplifier tube 76 through a phase inverter tube 104. The anode of the amplifier tube 76 is connected to the grid of the phase inverter tube 104 through a capacitor 106, and to ground through the capacitor 106 and a resistor 108. The cathode of the phase inverter 104 is connected to ground through a resistor 110. The anode of the phase inverter tube 104 is connected to the positive output terminal 18 through a resistor 111, and to the grid of the shunt regulator tube 94 through a capacitor 112. The grid of the shunt regulator tube 94, is connected to the positive output terminal 18 through a resistor 114. The values of the resistors 102 and 114 are such as to cause a relatively small amount of current to pass through the shunt regulator tube 94, whereby the shunt regulator tube 94 is maintained normally at an almost cut-off condition.

The operation of the regulated grid-control thyratron power supply of Fig. 3, in accordance with the present invention, will now be described. Tendencies for relatively slow changes in the output voltage, at frequencies lower than the frequency of rectification, are overcome by degeneratively fed back sample voltages from the anode of the amplifier tube 52 to the grids of the tubes 10 and 12, in the manner described for the power supply of Fig. 2. Let it be assumed that for one reason or another, there is a tendency for the output voltage across the output terminals 18 and 22 to decrease at a frequency greater than the frequency of rectification. A sample of the decreasing voltage is sensed by the cathode of the amplifier tube 76 and a negative-going signal is obtained at the anode thereof. This negative-going voltage is applied to the grid of the shunt regulator tube 34 through the capacitor 84, and to the grid of the phase inverter tube 104 through the capacitor 106. Since the shunt regulator tube 34 is now biased so that it normally conducts a relatively small amount of current, it will be driven to cut-off by the negative-going voltage from the anode of the tube 76. The negative-going voltage of the anode 76 however causes a positive-going signal to appear at the anode of the phase inverter tube 104. This latter positive-going signal is applied to the grid of the shunt regulator tube 94 through the capacitor 112, whereby the shunt regulator tube 94 is caused to conduct more heavily. As a result of more current flow through a shunt regulator tube 94, more current is provided to the load (not shown), across the output terminals 18 and 22, thereby tending to increase the voltage thereacross and to offset the tendency of this voltage to decrease. Transient voltage changes which occur at a frequency greater than that which may be controlled by the shunt regulator tubes 34 and 94, in the manner described, may be filtered by means of the relatively small filter capacitor 92.

It is noted that under usual operating conditions a change in the power supply output voltage cause, in general, by a change in input A. C. voltage or by a change in the load, for example, results in the simultaneous production of transient voltages of both low and high frequencies. The power supplies of the present invention, therefore, provide for a system of regulation whereby the regulation at the different frequencies supplement each other mutually. For example, a sudden change, resulting in a high frequency transient voltage, in the output voltage would be compensated for initially by the A. C. coupled shunt regulator tubes. However, since these regulator tubes are A. C. coupled, they must release control after a limited length of time. The time constants, the RC networks of the feedback circuits to the grids of the thyratrons and to the grids of the shunt regulator tubes, are such that the grid-controlled rectifiers gradually assume the regulation for the above-mentioned transient voltage as the shunt regulator tubes gradually release their control. Thus, the regulation of the power supplies of the present invention provide a means for simultaneously and continuously compensating for tendencies for the output voltage to change at all frequencies.

Thus, there has been shown and described, in accordance with the objects of the present invention, a highly improved regulated grid-controlled thyratron power supply capable of providing a substantially constant D. C.

output voltage by compensating for tendencies to change the output voltage at frequencies at or lower than the frequency of rectification, and at frequencies above the frequency of rectification. Tendencies for the output voltage to change at relatively low frequencies are compensated for by feeding back degeneratively a sample of the output voltage to the grids of a pair of thyratrons connected for full-wave rectification. This fedback voltage controls the average conduction of the thyratrons by causing conduction therethrough to take place sooner or later in response to the fedback sample, depending upon whether the output voltage is to be increased or decreased, respectively. Tendencies for the output voltage to change at a frequency greater than the frequency of rectification are compensated for by varying the impedance of a regulator tube, in one embodiment, inversely with the magnitude of the fedback sample signal. In another embodiment, two shunt regulator tubes are employed in a manner whereby each is operated close to its cut-off point, and wherein the fedback sample voltage signal is capacitively coupled to the grid of one of these tubes, and through a phase inverter to the grid of the other of these tubes. The regulated power supply, in accordance with the present invention, therefore, provides for regulation of the output voltage caused by fluctuations in voltage at substantiantially all frequencies. The efficiency of the regulated power supply of the present invention is also increased by eliminating the series regulator tube usually found in most conventional power supplies, and by operating the shunt regulator tubes normally at almost cut-off bias. It has been found that the power supply of the present invention is well suited for supplying power at relatively high current rates because the heat loss of this power supply is substantially one-half of the heat loss of the more conventional power supplies of the type using a series regulator tube.

What is claimed is:

1. A regulated power supply comprising a gas tube having an anode, a grid and a cathode, positive and negative output terminals, means connecting said anode, said grid and said cathode of said tube to fire said tube and to rectify an A. C. voltage input to a D. C. voltage output across said output terminals, said firing means comprising a voltage source of substantially constant frequency, means to feedback degeneratively a sample of said D. C. voltage output to said grid to control the firing of said tube by said voltage source, whereby to control the average conduction of said tube by voltage fluctuations of said D. C. voltage output, variable impedance means connected between said output terminals, and sample voltage output feedback means capacitively coupled to said variable impedance means to vary the impedance thereof inversely in response to voltage fluctuations of said D. C. voltage output.

2. A regulated power supply comprising a pair of gas tubes each having an anode, a grid and a cathode, positive and negative output terminals, means connecting respective anodes, grids and cathodes of said tubes to fire said tubes and to rectify an A. C. voltage input to a D. C. voltage output across said output terminals, said firing means comprising a voltage source of substantially constant frequency, means to feedback degeneratively a sample of said D. C. voltage output to said grids to control the firing of said tubes by said voltage source, whereby to control the average conduction of said tubes by voltage fluctuations of said D. C. voltage output, variable impedance means connected between said output terminals, and sample voltage output feedback means capacitively coupled to said variable impedance means to vary the impedance thereof inversely in response to voltage fluctuations of said D. C. voltage output.

3. A regulated power supply comprising a pair of gas tubes each having an anode, a grid and a cathode, positive and negative output terminals, means connecting respective anodes, grids and cathodes of said tubes to fire said tubes alternately and to rectify an A. C. voltage input to a D. C. voltage output across said output terminals, said firing means comprising a voltage source of substantially constant frequency, means to feedback degeneratively a sample of said D. C. voltage output to said grids to control the firing of said tubes by said voltage source, whereby to control the average conduction of said tubes by voltage fluctuations of said D. C. voltage output at relatively low frequencies in the order of the frequency of rectification of said tubes, variable impedance means connected between said output terminals, and sample voltage output feedback means capacitively coupled to said variable impedance means to vary the impedance thereof inversely in response to voltage fluctuations of said D. C. voltage output at frequencies higher than the frequency of rectification of said tubes.

4. A regulated power supply comprising a gas tube having an anode, a grid and a cathode, positive and negative output terminals, means connecting said anode, said grid and said cathode of said tube to fire said tube to rectify an A. C. voltage input to a D. C. voltage output across said output terminals, said firing means comprising a voltage source of substantially constant frequency, means to feedback degeneratively a sample of said D. C. voltage output to said grid to control the firing of said tube by said voltage source, whereby to control the average conduction of said tube by voltage fluctuations of said D. C. voltage output, a variable impedance device having an anode, a grid and a cathode, means connecting said device between said output terminals, and sample D. C. voltage output feedback means capacitively coupled to said grid of said device to vary the impedance thereof inversely in response to voltage fluctuations of said D. C. voltage output.

5. A regulated power supply comprising a pair of gas tubes each having an anode, a grid and a cathode, positive and negative output terminals, means connecting respective anodes, grids and cathodes of said tubes to fire said tubes and to rectify an A. C. voltage input to a D. C. voltage output across said output terminals, said firing means comprising a voltage source of substantially constant frequency, means to feedback degeneratively a sample of said D. C. voltage output to said grids to control the firing of said tubes by said voltage source, whereby to control the average conduction of said tubes by voltage fluctuations of said D. C. voltage output, a variable impedance device having an anode, a grid and a cathode, means connecting said device between said output terminals, and sample D. C. voltage output feedback means capacitively coupled to said grid of said device to vary the impedance thereof inversely in response to voltage fluctuations of said D. C. voltage output.

6. A regulated power supply comprising a pair of gas tubes each having an anode, a grid and a cathode, positive and negative output terminals, means connecting respective anodes, grids and cathodes of said tubes to fire said tubes alternately and to rectify an A. C. voltage input to a D. C. voltage output across said output terminals, said firing means comprising a voltage source of substantially constant frequency, means to feedback degeneratively a sample of said D. C. voltage output to said grids to control the firing of said tubes by said voltage source, whereby to control the average conduction of said tubes by voltage fluctuations of said D. C. voltage output at relatively low frequencies, a variable impedance device having an anode, a grid and a cathode, means connecting said device between said output terminals, and sample D. C. voltage output feedback means capacitively coupled to said grid of said device to vary the impedance thereof inversely in response to voltage fluctuations of said D. C. voltage output at frequencies higher than the frequency of rectification of said tubes.

7. A regulated power supply comprising a gas tube having an anode, a grid and a cathode, positive and negative output terminals, means including a voltage source of substantially constant frequency connecting said anode, said grid and said cathode of said tube to fire said tube and to rectify an A. C. voltage input to an A. C. voltage output across said output terminals, means to feedback degeneratively a sample of said D. C. voltage output to said grid to control the firing of said tube, whereby to control the average conduction of said tubes by voltage fluctuations of said D. C. voltage output, a first and a second variable impedance device said first having an anode, a separate source of unidirectional voltage, means connecting said second device in series with said source of unidirectional voltage and said positive output terminal, a grid and a cathode, means connecting each of said devices between said output terminals, a phase inverter connected between said terminals, and sample D. C. voltage output feedback means capacitively coupled to the grid of said first device and through said phase inverter to the grid of said second device to vary the impedances thereof inversely in response to voltage fluctuations of said D. C. voltage output.

8. A regulated power supply comprising a pair of gas tubes each having an anode, a grid and a cathode, positive and negative output terminals, means including a source of voltage of substantially constant frequency connecting respective anodes, grids and cathodes of said tubes to fire said tubes and to rectify an A. C. voltage input to a D. C. voltage output across said output terminals, means to feedback degeneratively a sample of said D. C. voltage output to said grids to control the firing of said tubes, whereby to control the average conduction of said tubes by voltage fluctuations of said D. C. voltage output, a first and a second variable impedance device each having an anode, a grid and a cathode, means connecting said first of said devices between said output terminals, a separate source of unidirectional voltage, means connecting said second device in series with said source of unidirectional voltage and said positive output terminal, a phase inverter connected between said output terminals, and sample D. C. voltage output feedback means capacitively coupled to the grid of said first device and through said phase inverter to the grid of said second device to vary the impedances thereof inversely in response to voltage fluctuations of said D. C. voltage output.

9. A regulated power supply comprising at least a pair of gas tubes each having an anode, a grid and a cathode, positive and negative output terminals, means including a source of substantially constant frequency connecting respective anodes, grids and cathodes of said tubes to fire said tubes alternately and to rectify an A. C. voltage input to an A. C. voltage output across said output terminals, means to feedback degeneratively a sample of said D. C. voltage output to said grids to control the firing of said tubes, whereby to control the average conduction of said tubes by voltage fluctuations of said D. C. voltage output at relatively low frequencies, a first and a second variable impedance device each having an anode, a grid and a cathode, means connecting said first of said devices between said output terminals, a separate source of unidirectional voltage, means connecting said second of said devices in series with said source of unidirectional voltage and said positive output terminal, a phase inverter connected between said terminals, and sample D. C. voltage output feedback means capacitively coupled to the grid of said first device and through said phase inverter to the grid of said second device to vary the impedances thereof inversely in response to voltage fluctuations of said D. C. voltage output at frequencies higher than the frequency of rectification of said tubes.

10. A regulated power supply comprising at least a pair of gas tubes each having an anode, a grid and a cathode, positive and negative output terminals, means including a source of substantially constant frequency connecting respective anodes, grids and cathodes of said tubes to fire said tubes and to rectify an A. C. voltage input to a D. C. voltage output across said output terminals, means to feedback degeneratively a sample of said D. C. voltage output to said grids to control the firing of said tubes, whereby to control the average conduction of said tubes by voltage fluctuations of said D. C. voltage output, a first and a second variable impedance device each having an anode, a grid and a cathode, means connecting said first of said devices between said output terminals, a separate source of unidirectional voltage, means connecting said second of said devices in series with said source of unidirectional voltage and said positive output terminal, a phase inverter connected between said terminals, sample D. C. voltage output feedback means capacitively coupled to the grid of said first device and through said phase inverter to the grid of said second device to vary the impedances thereof inversely in response to voltage fluctuations of said D. C. voltage output, and said first and second devices being biased normally near cut-off whereby to conduct substantially little current normally.

References Cited in the file of this patent

UNITED STATES PATENTS

| | | |
|---|---|---|
| 2,467,765 | Mayle | Apr. 19, 1949 |
| 2,530,169 | Lawrence | Nov. 14, 1950 |
| 2,598,473 | Warner | May 27, 1952 |